United States Patent
Pang

(10) Patent No.: US 9,778,102 B2
(45) Date of Patent: Oct. 3, 2017

(54) AMBIENT LIGHT SENSOR AND ADJUSTING METHOD THEREOF, AND ELECTRONIC PRODUCT

(71) Applicant: Huawei Device Co., Ltd., Shenzhen, P.R. China (CN)

(72) Inventor: Leilei Pang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 279 days.

(21) Appl. No.: 14/582,766

(22) Filed: Dec. 24, 2014

(65) Prior Publication Data

US 2015/0109455 A1    Apr. 23, 2015

Related U.S. Application Data

(63) Continuation of application No. PCT/CN2014/070224, filed on Jan. 7, 2014.

(30) Foreign Application Priority Data

Jan. 23, 2013 (CN) .......................... 2013 1 0025142

(51) Int. Cl.
*G01J 1/42* (2006.01)
*G01J 1/32* (2006.01)
(Continued)

(52) U.S. Cl.
CPC .......... *G01J 1/4204* (2013.01); *G01J 1/1626* (2013.01); *G01J 1/32* (2013.01); *G01J 3/505* (2013.01);
(Continued)

(58) Field of Classification Search
CPC .......... G01J 1/1626; G01J 1/32; G01J 1/4204; G01J 2001/4247; G01J 3/505; H04N 5/23293; H04N 5/33
(Continued)

(56) References Cited

U.S. PATENT DOCUMENTS 4,386,345 A * 5/1983 Narveson ............... G09G 1/285
345/20
4,410,841 A * 10/1983 Dusard .................. G09G 1/285
315/382
(Continued)

FOREIGN PATENT DOCUMENTS

CN    101779109 A    7/2010
JP    S5886504 A    5/1983
(Continued)

OTHER PUBLICATIONS

Ketsdever et al, Further Investigations into Continuously Variable, Remote Color Temperature Adjustments for Metal Halide Lamps, Dec. 4, 2016.*
(Continued)

*Primary Examiner* — Shan Elahi
(74) *Attorney, Agent, or Firm* — Kilpatrick Townsend & Stockton LLP

(57) ABSTRACT

A method for adjusting an ambient light sensor includes: acquiring a color temperature of light received by the ambient light sensor; and adjusting an output light intensity of the ambient light sensor according to the color temperature to enable output light intensities of the ambient light sensor to be consistent under received light with different color temperatures. The ambient light sensor includes: an acquiring device, configured to acquire a color temperature of light received by the ambient light sensor; and an adjuster, configured to adjust an output light intensity of the ambient light sensor according to the color temperature acquired by the acquiring device to enable output light intensities of the ambient light sensor to be consistent under received light with different color temperatures.

12 Claims, 4 Drawing Sheets

(51) Int. Cl.
*G01J 3/50* (2006.01)
*H04N 5/232* (2006.01)
*H04N 5/33* (2006.01)
*G01J 1/16* (2006.01)

(52) U.S. Cl.
CPC ........... *H04N 5/23293* (2013.01); *H04N 5/33* (2013.01); *G01J 2001/4247* (2013.01)

(58) Field of Classification Search
USPC ........................................................ 348/164
See application file for complete search history.

(56) References Cited

U.S. PATENT DOCUMENTS

| | | | |
|---|---|---|---|
| 6,611,249 B1* | 8/2003 | Evanicky | G01J 3/02 345/102 |
| 7,604,360 B2 | 10/2009 | Chen et al. | |
| 2002/0159065 A1* | 10/2002 | Berstis | G01J 3/02 356/406 |
| 2004/0189630 A1 | 9/2004 | Huh et al. | |
| 2005/0028254 A1* | 2/2005 | Whiting | E03D 9/007 4/213 |
| 2008/0158548 A1* | 7/2008 | Chen | G01J 1/1626 356/73 |
| 2008/0179497 A1 | 7/2008 | Maniam et al. | |
| 2009/0213041 A1* | 8/2009 | Unger | G02F 1/1336 345/52 |
| 2010/0187406 A1* | 7/2010 | Van Dalen | G01J 1/4204 250/214 AL |
| 2010/0194288 A1* | 8/2010 | Norgaard | G01J 1/32 315/149 |
| 2012/0268019 A1* | 10/2012 | Briggs | H05B 37/0218 315/158 |
| 2012/0313908 A1* | 12/2012 | Broga | G06F 1/1684 345/207 |

FOREIGN PATENT DOCUMENTS

| | | | |
|---|---|---|---|
| JP | H03103727 A | 4/1991 | |
| JP | 2007271626 A | 10/2007 | |
| JP | 2008275582 | 11/2008 | |
| JP | 2012-083174 A | 4/2012 | |
| KR | 20120119373 A | * 10/2012 | ................ G01J 1/08 |
| WO | WO 2009/016591 A2 | 2/2009 | |

OTHER PUBLICATIONS

Xin et al, Temperature Controlling System for LED lighting Bases on ARM, 2013.*

Graaf et al, Integrated CMOS Optical Microsystem for Illuminationg Source Identification, May 21-23, 2002.*

Chang et al, Auto Mixed Light for RGB LED Backlight Module, Jul. 5-8, 2009.*

Hee et al, English translations of the KR20120119373A could be found from KPO web sites, Oct. 31, 2012.*

* cited by examiner

AMBIENT LIGHT SENSOR AND ADJUSTING METHOD THEREOF, AND ELECTRONIC PRODUCT

CROSS-REFERENCE TO RELATED APPLICATIONS

This application is a continuation of International Application No. PCT/CN2014/070224, filed on Jan. 7, 2014, which claims priority to Chinese Patent Application No. 201310025142.9, filed on Jan. 23, 2013, both of which are hereby incorporated by reference in their entireties.

TECHNICAL FIELD

The present invention relates to the field of sensor technologies, and in particular, to an ambient light sensor and an adjusting method thereof, and an electronic product.

BACKGROUND

At present, a user experience degree of an electronic product is increasingly improved. For example, a mobile phone is used in different light source environments. An ambient light sensor in the mobile phone may detect brightness of an external light source, and the mobile phone automatically adjusts brightness of a mobile phone display according to the brightness of the external light source. Specifically, when brightness of external ambient light is relatively low, the brightness of the mobile phone display decreases, so that a user does not feel dazzled and power consumption is reduced; when the brightness of the external ambient light is relatively high, the brightness of the mobile phone display increases to avoid a phenomenon that the user cannot see a screen clearly. Therefore, use of the ambient light sensor improves the user experience degree and reduces the power consumption of the mobile phone.

However, output light intensities of an existing ambient light sensor are inconsistent under ambient light with different color temperatures, for example, daylight, cool white, and horizon light are three types of typical light sources with color temperatures ranging from high to low. As shown in FIG. 1, under three types of ambient light with different color temperatures, slopes of output light intensity curves of the ambient light sensor are different. Therefore, a light intensity only under a specific light source may be relatively accurately detected, and a deviation is generated when ambient light intensity detection is performed under ambient light with different color temperatures.

SUMMARY

The present invention provides an ambient light sensor and an adjusting method thereof, and an electronic product, which enables output light intensities of the ambient light sensor to be consistent under ambient light with different color temperatures, thereby avoiding an output light intensity deviation when intensities of ambient light with different color temperatures are detected.

To solve the foregoing technical problems, the present invention uses the following technical solutions:

According to one aspect, a method for adjusting an ambient light sensor is provided and includes:

acquiring a color temperature of light received by the ambient light sensor; and adjusting an output light intensity of the ambient light sensor according to the color temperature to enable output light intensities of the ambient light sensor to be consistent under received light with different color temperatures.

Further, the ambient light sensor includes: a first photodiode that is sensitive to visible light and infrared light, and a second photodiode that is sensitive only to infrared light; and the acquiring a color temperature of light received by the ambient light sensor includes:

acquiring a light spectral curve of the light received by the ambient light sensor, a light sensitivity curve of the first photodiode and a light sensitivity curve of the second photodiode;

integrating the light spectral curve of the light received by the ambient light sensor and the light sensitivity curve of the first photodiode to obtain a first data parameter Cdata, and integrating the light spectral curve of the light received by the ambient light sensor and the light sensitivity curve of the second photodiode to obtain a second data parameter Irdata; and acquiring a parameter ratio $$\frac{Cdata}{Irdata},$$

where the parameter ratio $$\frac{Cdata}{Irdata}$$

is used to reflect the color temperature of the light received by the ambient light sensor, where the output light intensity of the ambient light sensor is obtained according to the following output light intensity calculation formula:

Lux=K×MAX[(Cdata−B×Irdata), (C×Cdata−D×Irdata), 0], where Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value; and a process of the adjusting an output light intensity of the ambient light sensor according to the color temperature to enable output light intensities of the ambient light sensor to be consistent under received light with different color temperatures is:

adjusting a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

Further, a process of the adjusting a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}$$

is:

adjusting the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

According to another aspect, an ambient light sensor is provided and includes:

an acquiring device, configured to acquire a color temperature of light received by the ambient light sensor; and an adjuster, configured to adjust an output light intensity of the ambient light sensor according to the color temperature acquired by the acquiring device to enable output light intensities of the ambient light sensor to be consistent under received light with different color temperatures.

Further, the ambient light sensor further includes:

a first photodiode that is sensitive to visible light and infrared light, and a second photodiode that is sensitive only to infrared light, where the acquiring device includes:

a sub-acquiring device, configured to acquire a light spectral curve of the light received by the ambient light sensor, a light sensitivity curve of the first photodiode and a light sensitivity curve of the second photodiode;

an integrator, configured to integrate the light spectral curve of the light received by the ambient light sensor and the light sensitivity curve of the first photodiode to obtain a first data parameter Cdata, and integrate the light spectral curve of the light received by the ambient light sensor and the light sensitivity curve of the second photodiode to obtain a second data parameter Irdata; and a parameter ratio calculator, configured to acquire a parameter ratio $$\frac{Cdata}{Irdata},$$

where the parameter ratio $$\frac{Cdata}{Irdata}$$

is used to reflect the color temperature of the light received by the ambient light sensor.

Further, the ambient light sensor further includes:

an output light intensity calculator, configured to calculate the output light intensity, where an output light intensity calculation formula is:

Lux=K×MAX[(Cdata−B×Irdata), (C×Cdata−D×Irdata), 0], where Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value, where the adjuster is specifically configured to adjust a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

Further, the adjuster is specifically configured to adjust the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

According to another aspect, an electronic product is provided and includes: a display apparatus, a display brightness adjusting apparatus connected to the display apparatus and the foregoing ambient light sensor, where the ambient light sensor is connected to the display brightness adjusting apparatus.

According to the ambient light sensor and the adjusting method thereof, and the electronic product provided by the present invention, output light intensities of the ambient light sensor are adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
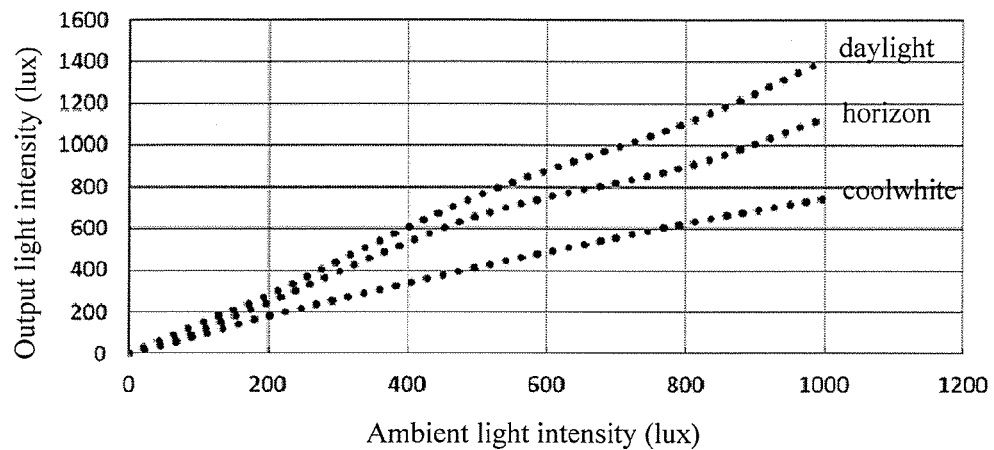
FIG. 1 is output light intensity curves of an ambient light sensor under ambient light with different color temperatures in the prior art.
Figure 2:
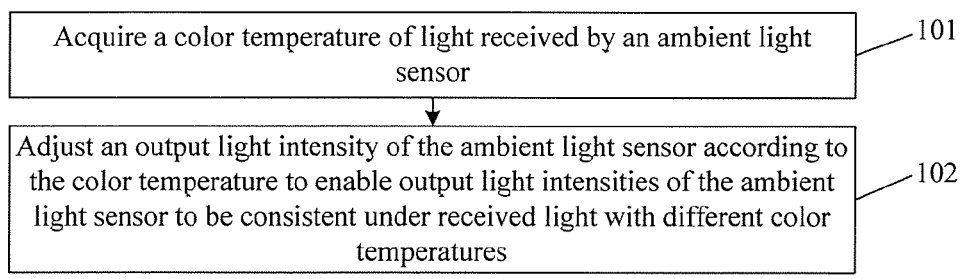
FIG. 2 is a flowchart of a method for adjusting an ambient light sensor according to an embodiment of the present invention.

As shown in FIG. 2, an embodiment of the present invention provides a method for adjusting an ambient light sensor, where the method includes:

Step 101. Acquire a color temperature of light received by the ambient light sensor.

Step 102. Adjust an output light intensity of the ambient light sensor according to the color temperature to enable output light intensities of the ambient light sensor to be consistent under received light with different color temperatures.

Specifically, the output light intensity of the ambient light sensor is obtained by means of calculation of a formula, where the formula may reflect that an output light intensity is directly proportional to an intensity of received light. Therefore, adding different coefficients to the formula can change a proportional relationship of the output light intensity and the intensity of the received light, so that the output light intensity can be adjusted according to different color temperatures of received light to implement consistency of output light intensities when the ambient light sensor receives light with different color temperatures.

According to the method for adjusting the ambient light sensor in this embodiment of the present invention, output light intensities of the ambient light sensor are adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

Further, the foregoing ambient light sensor specifically includes: a first photodiode that is sensitive to visible light and infrared light, and a second photodiode that is sensitive only to infrared light.

Figure 3:
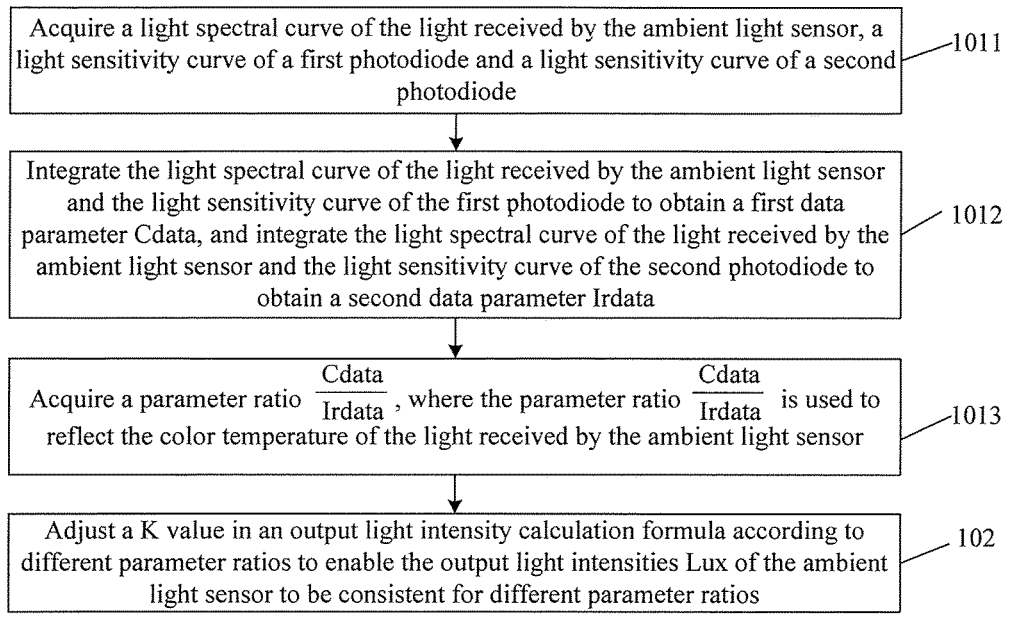
FIG. 3 is a flowchart of another method for adjusting an ambient light sensor according to an embodiment of the present invention.

As shown in FIG. 3, the acquiring a color temperature of light received by the ambient light sensor in the foregoing step 101 specifically includes:

Step 1011. Acquire a light spectral curve of the light received by the ambient light sensor, a light sensitivity curve of the first photodiode and a light sensitivity curve of the second photodiode.

Figure 4:
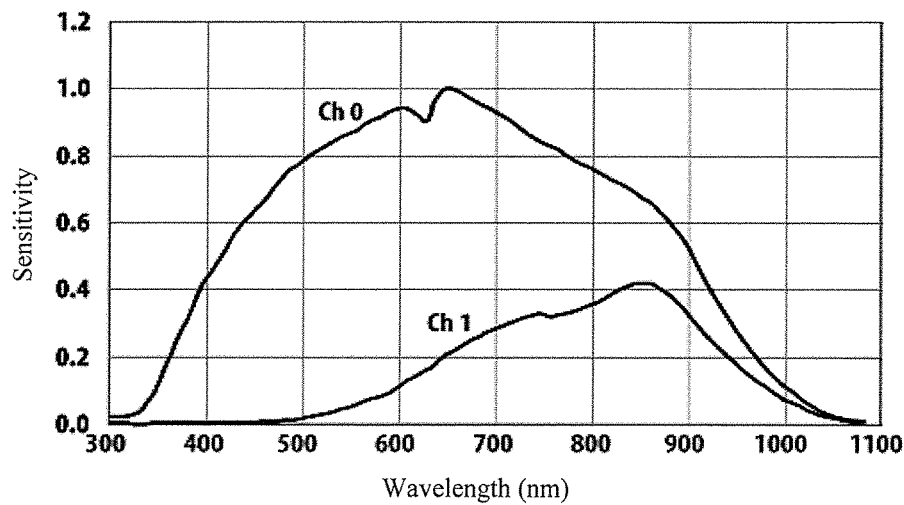
FIG. 4 is light sensitivity curves of a first photodiode and a second photodiode according to an embodiment of the present invention.

Specifically, according to properties of a photodiode itself, the photodiode has different light sensitivity curves. For example, as shown in FIG. 4, a Ch0 and a Ch1 are the light sensitivity curves of the first photodiode and the second photodiode respectively. It may be seen that, on the Ch0, the first photodiode is relatively sensitive within a scope of visible light with a wavelength of 300-700 nm, and of infrared light with a wavelength of 700-1100 nm, but on the Ch1, the second photodiode is relatively sensitive only within a scope of invisible infrared light. The two curves Ch0 and Ch1 herein are only used as an example, according to actual properties of the photodiodes in the ambient light sensor, the Ch0 and the Ch1 may be in other shapes, as long as the Ch0 reflects that the first photodiode is sensitive to both visible light and infrared light, and the Ch1 reflects that the second photodiode is sensitive only to infrared light.

Step 1012. Integrate the light spectral curve of the light received by the ambient light sensor and the light sensitivity curve of the first photodiode to obtain a first data parameter Cdata, and integrate the light spectral curve of the light received by the ambient light sensor and the light sensitivity curve of the second photodiode to obtain a second data parameter Irdata.

Step 1013. Acquire a parameter ratio $$\frac{Cdata}{Irdata},$$

where the parameter ratio $$\frac{Cdata}{Irdata}$$

is used to reflect the color temperature of the light received by the ambient light sensor.

For example, in this embodiment of the present invention, a parameter ratio of horizon light with a color temperature of 2300K is $$\frac{Cdata}{Irdata} \approx 2.1;$$

a parameter ratio of daylight with a color temperature of 6900K is $$\frac{Cdata}{Irdata} \approx 2.6;$$

and a parameter ratio of coolwhite with a color temperature of 4200K is $$\frac{Cdata}{Irdata} \approx 9.$$

Specifically, the output light intensity of the ambient light sensor is obtained according to the following output light intensity calculation formula:
Lux=K×MAX[(Cdata−B×Irdata), (C×Cdata−D×Irdata),0], where Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value. The output light intensity calculation formula can reflect that the output light intensity is directly proportional to an intensity of received light, therefore, adding different coefficients to the output light intensity calculation formula can change a proportional relationship of the output light intensity and the intensity of the received light, and adjusting a K value is equivalent to adding different coefficients to the output light intensity calculation formula.

A process of the adjusting an output light intensity of the ambient light sensor according to the color temperature to enable output light intensities of the ambient light sensor to be consistent under received light with different color temperatures in the foregoing step 102 is specifically:

adjusting the K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

For example, when the parameter ratio is $$0 \le \frac{Cdata}{Irdata} \le 2.25,$$

K' is adjusted to $$\frac{K}{1.2},$$

where K' is a coefficient in the output light intensity calculation formula after the adjustment, the adjustment of the K value is equivalent to adding a coefficient 1/1.2 to the output light intensity calculation formula; when the parameter ratio is $$2.25 < \frac{Cdata}{Irdata} \le 5,$$

K' is adjusted to $$\frac{K}{1.4};$$

and when the parameter ratio is $$5 < \frac{Cdata}{Irdata},$$

K' is adjusted to $$\frac{K}{0.8}.$$

Figure 5:
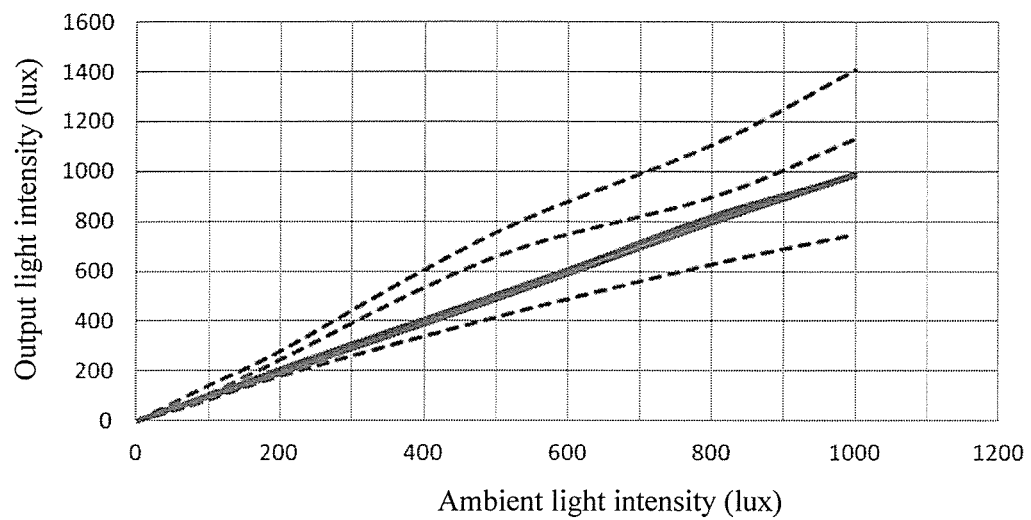
FIG. 5 is output light intensity curves of an ambient light sensor before and after a K value is adjusted according to an embodiment of the present invention.

As shown in FIG. 5, before the K value is adjusted, under three types of ambient light with different color temperatures, output light intensity curves of the ambient light sensor have different slopes, and after the K value is adjusted, the slopes of the output light intensity curves of the ambient light sensor are the same, that is, the output light intensities of the ambient light sensor are consistent.

Preferably, a process of the adjusting the K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}$$

is specifically:
adjusting the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

Specifically, for example, as shown in FIG. 5, under the three types of ambient light with the different color temperatures, dashed lines are the output light intensity curves of the ambient light sensor before the K value is adjusted, and solid lines are the output light intensity curves of the ambient light sensor after the K value is adjusted. It may be seen that, after the K value is adjusted, under the three types of ambient light with the different color temperatures, the slopes of the output light intensity curves of the ambient light sensor are all 1.

Certainly, it may also be set that after the K value is adjusted, under the three types of ambient light with the different color temperatures, the slopes of the output light intensity curves of the ambient light sensor are all 1.2 or 0.8 or another numeric value. The output light intensities of the ambient light sensor are enabled to be consistent as long as the slopes are the same; however, an output light intensity of the ambient light sensor is equal to, when the slope is 1, an intensity of light received by the ambient light sensor, which may best reflect a real ambient light intensity, thereby enabling brightness detected by the ambient light sensor to be consistent with that perceived by human eyes.

It should be noted that, a photodiode is an element for detecting light brightness in the ambient light sensor, because the photodiode is highly sensitive to infrared light and the infrared light is invisible light, it is unable to accurately simulate brightness perception of human eyes. Therefore, the ambient light sensor in this embodiment of the present invention includes the first photodiode that is sensitive to visible light and infrared light, and the second photodiode that is sensitive only to infrared light, and finally a response value of the latter is subtracted from a response value of the former to reduce infrared light interference to the minimum, so as to simulate real brightness perception of human eyes. It is understandable that, the ambient light sensor may also have only one photodiode, and infrared light interference is reduced by using an infrared cut-off membrane or another processing method. In a case in which only one photodiode exists, an output light intensity calculation formula of the ambient light sensor may be different, but an output light intensity still can be adjusted by means of the method of adding a coefficient. In addition, this embodiment of the present invention is described only by using output light intensity adjustment performed for the three types of ambient light with the different color temperatures, namely, horizon light, daylight and coolwhite, as an example, and a more specific division or a wider-scope division may also be performed on color temperatures of ambient light according to a need.

According to the method for adjusting an ambient light sensor in this embodiment of the present invention, output light intensities of the ambient light sensor are adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

Figure 6:
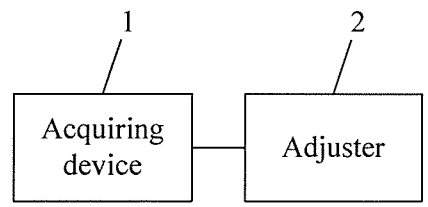
FIG. 6 is a structural block diagram of an ambient light sensor according to an embodiment of the present invention.

As shown in FIG. 6, an embodiment of the present invention further provides an ambient light sensor, where the ambient light sensor includes:

an acquiring device 1, configured to acquire a color temperature of light received by the ambient light sensor; and an adjuster 2, configured to adjust an output light intensity of the ambient light sensor according to the color temperature acquired by the acquiring device to enable output light intensities of the ambient light sensor to be consistent under received light with different color temperatures.

Specifically, a method and a principle for adjusting the ambient light sensor are the same as those in the foregoing embodiment, and details are not described repeatedly herein.

According to the ambient light sensor in this embodiment of the present invention, output light intensities of the ambient light sensor are adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

Figure 7:
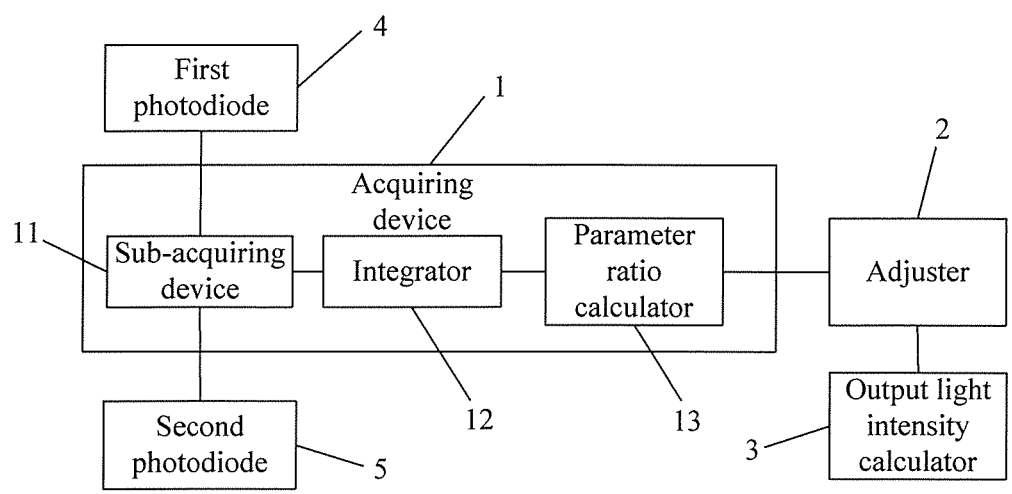
FIG. 7 is a structural block diagram of another ambient light sensor according to an embodiment of the present invention.

Further, as shown in FIG. 7, the foregoing ambient light sensor further includes:

a first photodiode D1 that is sensitive to visible light and infrared light, and a second photodiode D2 that is sensitive only to infrared light, where the acquiring device 1 includes:

a sub-acquiring device 11, configured to acquire a light spectral curve of the light received by the ambient light sensor, a light sensitivity curve of the first photodiode 4 and a light sensitivity curve of the second photodiode 5;

an integrator 12, configured to integrate the light spectral curve of the light received by the ambient light sensor and the light sensitivity curve of the first photodiode 4 to obtain a first data parameter Cdata, and integrate the light spectral curve of the light received by the ambient light sensor and the light sensitivity curve of the second photodiode 5 to obtain a second data parameter Irdata; and a parameter ratio calculator 13, configured to acquire a parameter ratio $$\frac{Cdata}{Irdata};$$

where the parameter ratio $$\frac{Cdata}{Irdata}$$

is used to reflect the color temperature of the light received by the ambient light sensor.

Further, the foregoing ambient light sensor further includes:

an output light intensity calculator 3, configured to calculate the foregoing output light intensity, where an output light intensity calculation formula:

Lux=K×MAX[(Cdata−B×Irdata), (C×Cdata−D×Irdata), 0], where Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value, where the adjuster 2 is specifically configured to adjust a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

Further, the adjuster 2 is specifically configured to adjust the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

Specifically, a method and a principle for adjusting the ambient light sensor are the same as those in the foregoing embodiment, and details are not described repeatedly herein.

According to the ambient light sensor in this embodiment of the present invention, output light intensities of the ambient light sensor are adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

An embodiment of the present invention further provides an electronic product, including: a display apparatus, a display brightness adjusting apparatus connected to the display apparatus and the foregoing ambient light sensor, where the ambient light sensor is connected to the display brightness adjusting apparatus, and the display brightness adjusting apparatus is configured to adjust brightness of the display apparatus according to an output light intensity of the ambient light sensor. Specifically, when the output light intensity of the ambient light sensor is relatively low, that is, the ambient light intensity is relatively low, the brightness of the display apparatus decreases, so that a user does not feel dazzled, and power consumption is reduced; and when the output light intensity of the ambient light sensor is relatively high, that is, the ambient light intensity is relatively high, the brightness of the display apparatus increases, which avoids a phenomenon that the user cannot see the screen clearly. A specific structure and an adjusting method of the ambient light sensor are the same as those in the foregoing embodiments, and details are not described repeatedly herein.

It should be noted that, the foregoing electronic product may be a mobile phone, an MP4, a tablet computer or another portable electronic device. The foregoing ambient light sensor may be a sensor that functions separately, and may also be integrated in a three-in-one light sensor. For example, in addition to having an ambient light sensor, a three-in-one light sensor in a mobile phone is also integrated with an infrared LED and an optical proximity sensor, where the infrared LED is configured to emit proximity light, and the optical proximity sensor is configured to receive proximity light reflected by a face when the mobile phone is close to the face, thereby closing the screen to reduce power consumption.

According to the electronic product in this embodiment of the present invention, an output light intensities of an ambient light sensor is adjusted according to received light with different color temperatures to enable the output light intensities to be consistent when the ambient light sensor receives the light with the different color temperatures, thereby avoiding an output light intensity deviation generated when the ambient light sensor detects intensities of the ambient light with the different color temperatures.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for adjusting an ambient light sensor, the method comprising:
    acquiring a color temperature of an incoming light received by the ambient light sensor, the color temperature of the received light measuring a color characteristic of the incoming light in Kelvins;
    in response to the incoming light having been received, calculating an intensity of a light output by the ambient light sensor;
    adjusting the calculated intensity of the output light of the ambient light sensor according to the color temperature of the incoming light for achieving consistency with other incoming lights having different color temperatures as received by the ambient light sensor; and
    communicating the intensity of the light output by the ambient light sensor to a brightness adjustment apparatus to enable the brightness adjustment apparatus to effectuate a brightness adjustment of a display device based on the intensity of the light output by the ambient light sensor.

2. The method for adjusting an ambient light sensor according to claim 1, wherein the ambient light sensor comprises: a first photodiode that is sensitive to visible light and infrared light, and a second photodiode that is sensitive only to infrared light, and wherein the method further comprises:
    acquiring a light spectral curve of the incoming light received by the ambient light sensor, a light sensitivity curve of the first photodiode and a light sensitivity curve of the second photodiode;
    integrating the light spectral curve of the incoming light received by the ambient light sensor and the light sensitivity curve of the first photodiode to obtain a first data parameter Cdata, and integrating the light spectral curve of the incoming light received by the ambient light sensor and the light sensitivity curve of the second photodiode to obtain a second data parameter Irdata, and acquiring a parameter ratio between the Cdata and Irdata as $$\frac{Cdata}{Irdata},$$

wherein the parameter ratio $$\frac{Cdata}{Irdata}$$

is used to reflect the color temperature of the light received by the ambient light sensor; and, wherein
the intensity adjustment of the output light of the ambient light sensor is based on the parameter ratio $$\frac{Cdata}{Irdata}.$$

3. The method for adjusting an ambient light sensor according to claim 2, wherein:
the output light intensity of the ambient light sensor is adjusted according to the following output light intensity calculation formula:
Lux=K×MAX [(Cdata−B×Irdata),(C×Cdata−D×Irdata), 0], wherein Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value; and
adjusting the intensity of the output light of the ambient light sensor according to the color temperature of the incoming light comprises:
adjusting a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

4. The method for adjusting an ambient light sensor according to claim 3, wherein:
adjusting the K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}$$

comprises:
adjusting the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

5. An ambient light sensor, comprising:
an acquiring device, configured to a color temperature of an incoming light received by the ambient light sensor, the color temperature of the received light measuring a color characteristic of the incoming light in Kelvins;
an output light intensity calculating device configured to calculate an intensity of a light output by the ambient light sensor; and
an adjusting device, configured to adjust the calculated intensity of the output light of the ambient light sensor according to the color temperature of the incoming light for achieving consistency with other incoming lights having different color temperatures as received by the ambient light sensor; and, wherein the ambient light sensor is configured to
communicate the intensity of the light output by the ambient light sensor to a brightness adjustment apparatus to enable the brightness adjustment apparatus to effectuate a brightness adjustment of a display device based on the intensity of the light output by the ambient light sensor.

6. The ambient light sensor according to claim 5, further comprising:
a first photodiode sensitive to visible light and infrared light, the first photodiode being operatively connected to the acquiring device;
a second photodiode sensitive only to infrared light, the second photodiode being operatively connected to the acquiring device; and
wherein the acquiring device comprises:
a sub-acquiring device, configured to acquire a light spectral curve of the incoming light received by the ambient light sensor, a light sensitivity curve of the first photodiode and a light sensitivity curve of the second photodiode,
an integrator, configured to integrate the incoming light spectral curve of the light received by the ambient light sensor and the light sensitivity curve of the first photodiode to obtain a first data parameter Cdata, and integrate the incoming light spectral curve of the light received by the ambient light sensor and the light sensitivity curve of the second photodiode to obtain a second data parameter Irdata, and
a parameter ratio calculator, configured to acquire a parameter ratio between the Cdata and Irdata as wherein the parameter ratio $$\frac{Cdata}{Irdata},$$

$$\frac{Cdata}{Irdata}$$

is used to reflect the color temperature of the light received by the ambient light sensor; and, wherein
the intensity adjustment of the output light of the ambient light sensor by the adjusting device is based on the parameter ratio $$\frac{Cdata}{Irdata}.$$

7. The ambient light sensor according to claim 6, wherein:
the output light intensity calculating device is further, configured to calculate the output light intensity according to an output light intensity calculation formula comprising:
Lux=K×MAX [(Cdata−B×Irdata),(C×Cdata−D×Irdata), 0], wherein Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value; and
wherein the adjusting device is configured to adjust a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

8. The ambient light sensor according to claim 7, wherein the adjusting device is configured to adjust the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

9. An electronic product, comprising:
a display apparatus;
a display brightness adjusting apparatus connected to the display apparatus and an ambient light sensor, wherein the ambient light sensor is connected to the display brightness adjusting apparatus; and
wherein the ambient light sensor comprises:
an acquiring device, configured to a color temperature of an incoming light received by the ambient light sensor, the color temperature of the received light measuring a color characteristic of the incoming light in Kelvins;
an output light intensity calculating device configured to calculate an intensity of a light output by the ambient light sensor; and
an adjusting device, configured to adjust the calculated intensity of the output light of the ambient light sensor according to the color temperature of the incoming light for achieving consistency with other incoming lights having different color temperatures as received by the ambient light sensor; and, wherein the ambient light sensor is configured to
communicate the intensity of the light output by the ambient light sensor to a brightness adjustment apparatus to enable the brightness adjustment apparatus to effectuate a brightness adjustment of a display device based on the intensity of the light output by the ambient light sensor.

10. The electronic product according to claim 9, wherein the ambient light sensor further comprises:
a first photodiode that is sensitive to visible light and infrared light, the first photodiode being operatively connected to the acquiring device;
a second photodiode that is sensitive only to infrared light, the second photodiode being operatively connected to the acquiring device; and
the acquiring device comprises:
a sub-acquiring device, configured to acquire a light spectral curve of the incoming light received by the ambient light sensor, a light sensitivity curve of the first photodiode and a light sensitivity curve of the second photodiode,
an integrator, configured to integrate the incoming light spectral curve of the light received by the ambient light sensor and the light sensitivity curve of the first photodiode to obtain a first data parameter Cdata, and integrate the incoming light spectral curve of the light received by the ambient light sensor and the light sensitivity curve of the second photodiode to obtain a second data parameter Irdata, and
a parameter ratio calculator, configured to acquire a parameter ratio between the Cdata and Irdata as $$\frac{Cdata}{Irdata},$$

wherein the parameter ratio $$\frac{Cdata}{Irdata}$$

is used to reflect the color temperature of the light received by the ambient light sensor; and, wherein the intensity adjustment of the output light of the ambient light sensor by the adjusting device is based on the parameter ratio $$\frac{Cdata}{Irdata}.$$

11. The electronic product according to claim 10, wherein the ambient light sensor further comprises:

the output light intensity calculating device is further, configured to calculate the output light intensity according to an output light intensity calculation formula comprising:

Lux=K×MAX [(Cdata−B×Irdata),(C×Cdata−D×Irdata), 0], wherein Lux is an output light intensity of the ambient light sensor; K, B, C and D are coefficients that are used to enable the output light intensity of the ambient light sensor to be close to a light intensity perceived by human eyes; and MAX is an operation symbol for obtaining a maximum value; and wherein the adjusting device is configured to adjust a K value in the output light intensity calculation formula according to different parameter ratios $$\frac{Cdata}{Irdata}$$

to enable the output light intensities Lux of the ambient light sensor to be consistent for different parameter ratios $$\frac{Cdata}{Irdata}.$$

12. The electronic product according to claim 11, wherein the adjusting device is configured to adjust the K value in the output light intensity calculation formula according to the different parameter ratios $$\frac{Cdata}{Irdata}$$

to enable the output light intensities of the ambient light sensor to be equal to intensities of the light received by the ambient light sensor for the parameter ratios $$\frac{Cdata}{Irdata}.$$

* * * * *